J. Powell,
Cultivator.

No. 88,409.          Patented Mar. 30, 1869.

Witnesses:
Joh. Becker.
Wm. A. Morgan.

Inventor:
J. Powell
by Munn & Co.
Attorney.

JOHN POWELL, OF SULLIVAN, ILLINOIS.

Letters Patent No. 88,409, dated March 30, 1869.

IMPROVEMENT IN CULTIVATORS.

The Schedule referred to in these Letters Patent and making part of the same

*To all whom it may concern:*

Be it known that I, JOHN POWELL, of Sullivan, in the county of Moultrie, and State of Illinois, have invented a new and useful Improvement in Cultivators; and I do hereby declare that the following is a full, clear, and exact description thereof, which will enable others skilled in the art to make and use the same, reference being had to the accompanying drawings, forming part of this specification.

This invention relates to improvements in cultivators, or gang-plows, and has for its object to provide a more simple and convenient arrangement of means for vibrating the plows laterally, adjusting them to vary the distance apart, and to govern their depth of cutting.

Similar letters of reference indicate corresponding parts.

Figure 1:
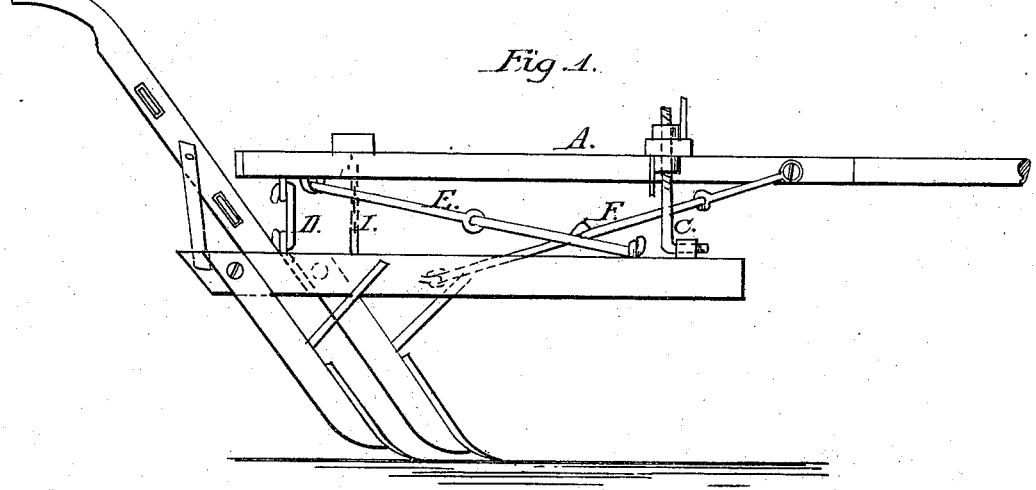
Figure 1 represents a side elevation of my improved machine.
Figure 2:
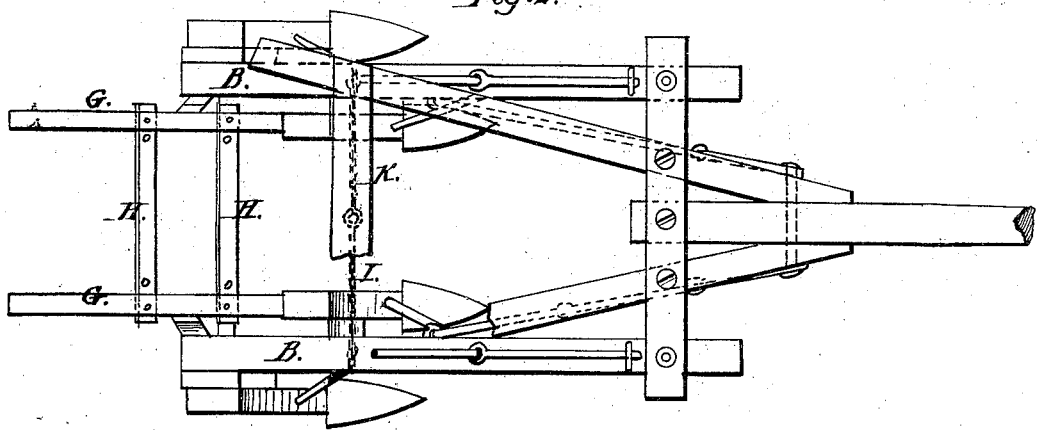
Figure 2 represents a plan view of the same.

A represents the drawing-frame, to which two sets of two cultivators, each connected to one beam, B, are connected by the vertically-adjustable bolts C, links D, and chains, or jointed rods E and F.

The front ends of the beams B are connected to the said bolts in a manner to permit the beams to oscillate, and the links D allow them to swing laterally to a limited extent while oscillating.

The chains E and F are the means for drawing the cultivators either forward or back by the frame A, and support the latter above the beams, while permitting the oscillatory and vibratory movement of the plows.

The plow-handles G are connected together by the bars H, connected to them by loose joints, which permit the vibration of the handles, and the connections are adjustable to vary the distance of the plows apart, and a chain, I, is connected to the beams and the centre of the cross-bar K, of the frame A, for employment, in conjunction with the adjustable bar H, for adjusting the beams to or from each other, the chain being arranged to be taken up by hooking the links to the cross-beam.

The adjusting-bolts C may be raised or lowered to regulate the depth of the plowing.

By this arrangement an adjustable cultivator is provided, of very simple and cheap construction, which may be readily adjusted as to depth of cutting, and admits of guiding the course of the plows by simply turning the handles to the right or left.

Having thus described my invention,

I claim as new, and desire to secure by Letters Patent—

1. The beams B, in combination with the chains E and F, adjustable bolts C, links D, and frame A, as herein described, for the purpose specified.

2. In combination with the above, the handles G, adjustable bars H, and chain I, as herein described, for the purpose specified.

JOHN POWELL.

Witnesses:
 ALFRED N. SMYSER,
 JACOB N. SAGER.